(12) United States Patent
Fournie et al.

(10) Patent No.: US 9,608,320 B2
(45) Date of Patent: Mar. 28, 2017

(54) METHOD OF OPENING A PROTECTIVE DOME, IN PARTICULAR A RADOME, AND RADOME EQUIPPED WITH A PANTOGRAPH FOR IMPLEMENTATION THEREOF

(75) Inventors: Jacques Fournie, Grenade (FR);
Christophe Bernus, Toulouse (FR);
Thony Dupas, Toulouse (FR); Jerome Phalippou, Tournefeuille (FR); Gilles Mercadier, Saint Sulpice sur Tarn (FR);
Nicolas Toureille, Toulouse (FR);
Frederic Milin, Colomiers (FR); Jean Redon, Toulouse (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 519 days.

(21) Appl. No.: 14/129,500

(22) PCT Filed: Jun. 26, 2012

(86) PCT No.: PCT/FR2012/051455
§ 371 (c)(1),
(2), (4) Date: Sep. 29, 2014

(87) PCT Pub. No.: WO2013/001224
PCT Pub. Date: Jan. 3, 2013

(65) Prior Publication Data
US 2016/0190679 A1 Jun. 30, 2016

(30) Foreign Application Priority Data
Jun. 27, 2011 (FR) ...................... 11 55687

(51) Int. Cl.
*H01Q 1/42* (2006.01)
*B64C 1/36* (2006.01)
*H01Q 1/28* (2006.01)

(52) U.S. Cl.
CPC ................. *H01Q 1/42* (2013.01); *B64C 1/36* (2013.01); *H01Q 1/281* (2013.01)

(58) Field of Classification Search
CPC .................................. H01Q 1/42; H01Q 1/281
See application file for complete search history.

(56) References Cited

U.S. PATENT DOCUMENTS

| 2,943,756 A | 7/1960 | White |
| 3,653,615 A | 4/1972 | Spence |
| (Continued) | | |

FOREIGN PATENT DOCUMENTS

DE 1481684 A1 3/1969

OTHER PUBLICATIONS

ISA European Patent Office, International Search Report for Application No. PCT/FR2012/051455, dated Sep. 27, 2012.

*Primary Examiner* — Hoang V Nguyen
*Assistant Examiner* — Michael Bouizza
(74) *Attorney, Agent, or Firm* — Lorenz & Kopf, LLP.

(57) ABSTRACT

A method for opening a dome for the protection of a device to be protected, fitted in a part described as fixed, in which, in the initial position before opening, a generally plane interface separates the dome from the fixed part, is provided. The method includes connecting the dome to the fixed part by at least two independent double-link connections that are movable in rotation between the dome and the fixed part. The links in a single connection being fitted in common to the dome and to the fixed part to form overall a pantograph in the shape of an isosceles trapezium which, during opening, opens out by pivoting until maximum opening is achieved, so that the dome moves away from the fixed part via a combination of movements in translation and in rotation.

20 Claims, 4 Drawing Sheets

(56) References Cited

U.S. PATENT DOCUMENTS 6,796,529 B1 9/2004 Duran et al.
2007/0045467 A1 3/2007 Jeanneau et al.

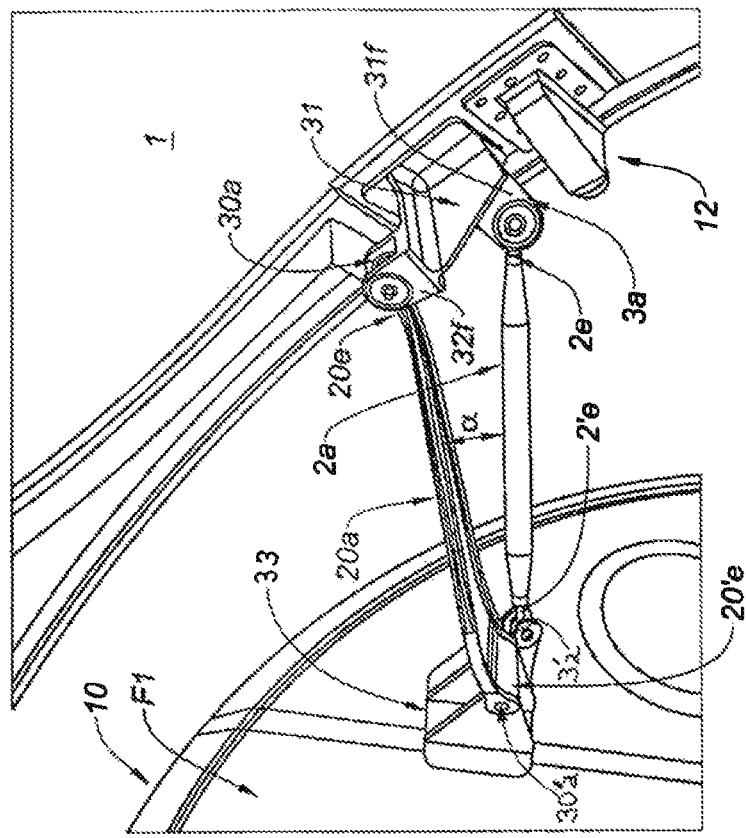
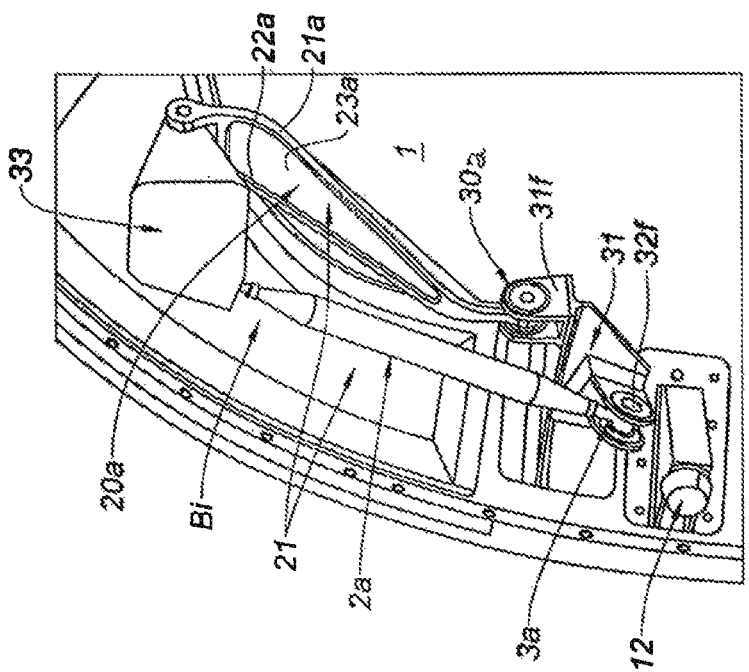

METHOD OF OPENING A PROTECTIVE DOME, IN PARTICULAR A RADOME, AND RADOME EQUIPPED WITH A PANTOGRAPH FOR IMPLEMENTATION THEREOF

CROSS-REFERENCE TO RELATED APPLICATIONS

This application is a U.S. National-Stage entry under 35 U.S.C. §371 based on International Application No. PCT/FR2012/051455, filed Jun. 26, 2012 which was published under PCT Article 21(2) and which claims priority to French Application No. 1155687, filed Jun. 27, 2011, which are all incorporated herein by reference in their entirety.

TECHNICAL FIELD

The technical field relates to a method for opening a dome for the protection of a device to be protected, in particular of a structure for receiving and/or emitting waves such as a radar device or a telecommunications antenna, in particular for opening an aircraft radome, and also a radome equipped with a pantograph capable of implementing this method.

Systems for opening domes for the protection of structures, such as aircraft radomes, are in general designed to be able to fulfil different requirements related to use, maintenance, manufacture and assembly, taking into consideration, in particular, the problems of weight and corrosion.

In one example, opening systems have a fixed part and a movable part consisting of movable mechanical elements that define rectilinear, lateral circular, or pivoting opening kinematics.

BACKGROUND

It is known, for example in the field of aeronautics, that opening systems can have extension members chosen from among rectilinear or gooseneck arms, hinges, removable fixing devices and/or lateral arms and rods.

Thus, the rectilinear arms on the circumference of the dome enable the rotary shaft to be reached when the dome is opened. Adjustments can then be made during assembly. In addition, rectilinear arms of this kind constitute a solution that does not produce significant excess mass.

The use of gooseneck arms with the same aim, inside the circumference of the dome, requires more weight because this solution needs additional means on the rotary shaft, which shaft must be situated behind the movable part. The presence of this additional part means that the interface between the structure to be protected and the mechanism for opening is complex and expensive. The seal at this interface is also complex and the unit is made heavier.

In a configuration that opens laterally, the arms are fitted to a common hinge and the movement of each arm is guided by a link rod. This configuration produces the same disadvantages as the solution above. In addition, lateral opening is not optimum for maintenance, as it then requires a double access for two operators, which can involve interactions with the maintenance platform.

Opening via external hinges is a lighter solution than the preceding one but, like the solution with rectilinear arms, it requires more adjustments and increases the aerodynamic drag.

The above systems for opening can be implemented only with rigid movable parts. Thus, composite radomes for aircraft must be stiffened, for example via a metal frame. This involves additional costs, and weight and complexity of the movable assembly. In addition, a stiffening frame requires a rigid interface with a chassis for mounting the fixed structure. The result is an increase in the amounts of play and the presence of aerodynamic steps between the radome and the fixed part.

A system for opening via removable fasteners enables the structure to be made lighter because no additional opening mechanism is used. In addition, the movable part does not need to be dimensioned to receive the housings of the structural mechanisms when the movable part is open.

The advantages of this solution lie in the fact that the movable part is more easily positioned during assembly and meets the aerodynamic requirements. Thus, when the movable part is open during maintenance operations, it is held by a specific tool.

The disadvantages arise from the time devoted to withdrawing the fasteners in general beyond the maintenance objectives, and the need for basic service equipment which is not always available.

In addition, other objects, desirable features and characteristics will become apparent from the subsequent summary and detailed description, and the appended claims, taken in conjunction with the accompanying drawings and this background.

SUMMARY

The aim of the various embodiments of the present disclosure is to effect the opening a protective dome without the disadvantages described above, in particular simple and rapid opening that allows access to a device (for example, a radar communication device and/or other communication systems) without risk of corrosion or damage (resistant to extreme loads and to wind), rapidly assembled and adjusted using simple tools, weighs little, economical in its costs and with a reduced aerodynamic drag.

To do this, the present disclosure provides unique kinematics combining two movements in such a way as to move the dome away while rapidly opening a working space.

More specifically, the present disclosure relates to a method for opening a protective dome for a device to be protected, in one example, a structure for telecommunication by emission/reception of waves that is fitted in a part described as fixed. In the initial position before opening, an interface (generally a plane for reasons of sealing) separates the dome from the fixed part. In this method, the dome is connected to the fixed part by at least two independent double-link connections that are movable in rotation between the dome and the fixed part. The links in a single connection are fitted in common to form overall a pantograph in the shape of an isosceles trapezium which, during opening, opens out by pivoting until opening is complete. This opening out is effected in such a way that the dome moves away from the fixed part via a combination of movements in translation and in rotation.

Inclining the links to form a trapezium enables the system to be stiffened by proper maintenance of lateral stability during and at the end of opening.

Advantageously, the links of each connection are mounted in articulation on the periphery of the dome, in one example, on the internal rim of the dome. This arrangement enables stability to be increased.

Furthermore, the movable links of a connection are dimensioned so that the opening kinematics starts with a phase of movement of the dome substantially in translation perpendicular to the plane of the interface, followed by a phase of movement of the dome substantially in translation and rotation around a fixed axis parallel to the axis of pivot of the pantograph. Advantageously, the opening kinematics is an opening out upwards in use mode, the final position of the dome defining, relative to its initial position, an angle of opening of between about 30° and about 80°, in one example, between about 40° and about 50°. There is provision for automatic locking, advantageously at the end of a telescopic extension, when the dome has reached its final open position.

In addition, the links on the dome advantageously have a resilience that enables adjustment to be avoided.

The present disclosure also relates to a radome capable of being connected to a fixed part, in particular according to the above method. A radome of this kind has a dome-shaped protective cover and articulated linking mechanisms of which the first extremities can be connected in rotation to the protective cover. Second extremities can be connected in rotation to the fixed part onto which a communication system to be protected by the radome is mounted. The linking mechanisms consist of at least two pairs. The extremities of each connecting pair are mounted on a common fitting via means for connecting in rotation. Each connecting pair forms one of the sides of a pantograph shaped as an isosceles trapezium. This double-link architecture, of linkage and arm, the extremities of which are attached to a common fitting, advantageously enables the masses to be reduced, as the kinematics parts and fittings are light in structure.

According to various embodiments: each pair consists of two linking elements made up of a rectilinear guide linkage and an arm of greater mechanical strength, each element of each pair being capable of pivoting overall around a fixed axis; and each pair consists of two linking elements made up of a rectilinear guide linkage and an arm of greater mechanical strength, each element of each pair being capable of pivoting overall around a fixed axis. In addition, according to various embodiments, at least two telescopic rods are capable of being attached in rotation to the radome and to the fixed part in order to produce automatic locking when the radome has reached its final open position; and the means for connection in rotation of the extremities of the connecting pairs to the radome are swivel bearings on a support made of resilient material (known as "shock mount" or "silent block" bearings).

Further, according to various embodiments, the sides of the isosceles trapezium form an angle of about 50° to about 70°, in one example, about 60°, with the bases; and the linkage and the arm of a connecting pair have, in lateral projection when in use, a constant angle of separation, in one example, from about 5° to about 30°, for example, from about 10° to about 25°. In various embodiments, the arms of greater mechanical strength are curved, form two edges machined as ribs and are connected to the support by double shear; and advantageously, the stiffness of the arms of each connecting pair is calculated under bending load around a vertical axis passing through the extremity on the fixed part in such a way as to limit deflection of the dome under extreme loads.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIGS. 5 and 6 illustrate a connecting pair with linkage and curved arm in a frontal view of the rim of the radome and in a perspective view between the radome and the fixed part.

DETAILED DESCRIPTION

Figure 1:
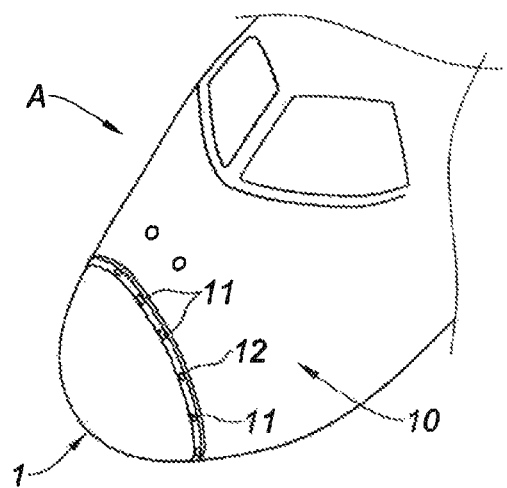
FIG. 1 is a perspective view of the nose of an aircraft with a radome.

The following detailed description is merely exemplary in nature and is not intended to limit the present disclosure or the application and uses of the present disclosure. Furthermore, there is no intention to be bound by any theory presented in the preceding background or the following detailed description.

Throughout this text, the part on which the radome rests, an extremity of an aircraft fuselage in the case of the examples that follow, is described as fixed because it serves as a reference for the movement to open the radome. The central axis X'X in the drawings is horizontal, in other words, parallel to the ground on which the aircraft stands, a vertical plane being perpendicular to the ground. The qualifiers "upper" and "lower", or equivalent terms, relate to the relative positions of the parts of a single object, for example the radome, relative to the ground.

In FIG. 1, the nose of an aircraft A consists of a radome 1 formed from a dome of composite material capable of protecting a radar antenna. The radome 1 is connected to the fuselage 10 of the aircraft A, this fuselage constituting the part described as fixed. The radome and the fuselage are connected by fasteners 11 and centring elements 12 to facilitate fitting.

Figure 2:
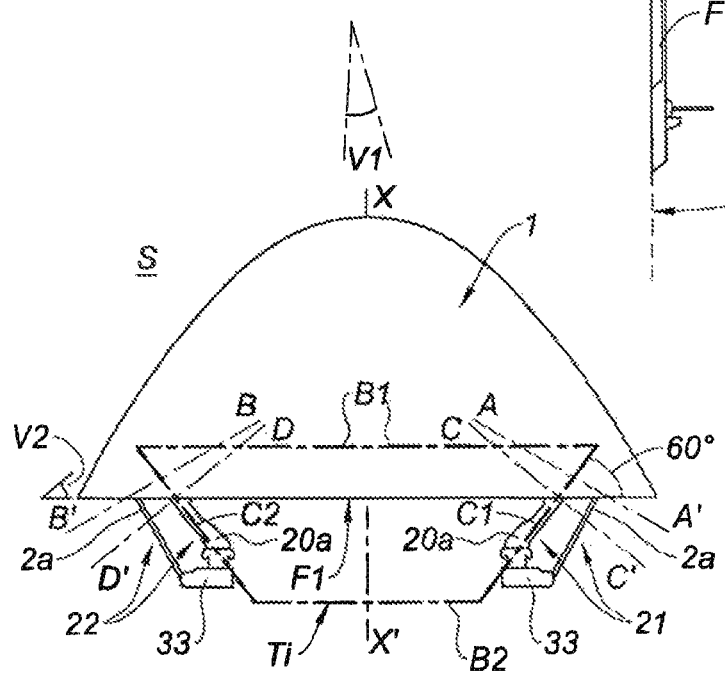

With reference to the upper view shown in FIG. 2, the example of a radome 1 is in an intermediately open position. This radome is made of a composite material. This drawing is simplified so that the only linking elements shown are two connecting pairs 21 and 22, which are symmetrical relative to the central vertical plane V1 passing through the central axis X'X. The links 21 and 22 consist of a linkage 2a and of a curved arm 20a with two machined edges forming ribs framing a plane wall. These links are made of a metal alloy, for example an aluminium alloy. The mechanical strength of the arms is greater than that of the linkages.

In the plane of FIG. 2, parallel to the ground S, these links—in particular the arms 20a and 20b as shown in the drawing—form the sides C1 and C2 of an isosceles trapezium-shaped pantograph TI of which the bases B1 and B2 are shown in dot-and-dash lines. In the plane of the drawing, the linkages 2a and the arms 20a of a single pair 21 or 22 appear generally parallel and form an angle of approximately 60° relative to a vertical plane V2 parallel to the entry face F1 of the fixed part (see FIG. 3) and to the bases B1, B2. The connecting pairs 21 and 22 are mounted in common on a single support at their extremities (symmetrically relative to the plane V1): on, respectively, the fittings 31, at the inner rim Bi of the cover forming the radome 1 (see FIG. 3), and the fittings 33 for the entry face of the fixed part. These mountings in common on a single fitting advantageously allow a common absorption of the forces transmitted.

Figure 3:
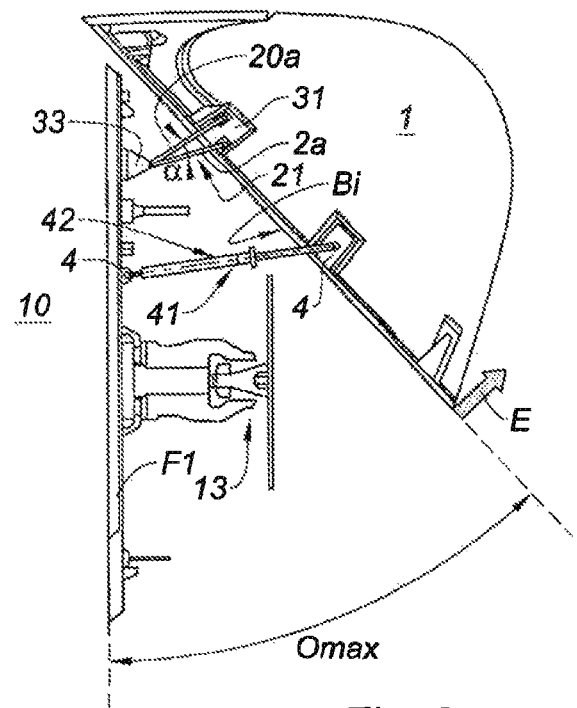
FIGS. 2 and 3 are two views, upper and lateral respectively, of an example of a radome according to the present disclosure in the intermediate and fully open positions respectively.

In the lateral view shown in FIG. 3, the entry face F1 of the fixed part 10 is shown vertically. Approximately at the centre of this face F1, a radar antenna 13 is mounted. In this drawing, a connecting pair 21 and a telescopic rod 41 fixed, at its extremities, to the inner rim Bi of the radome 1 and to the face F1 via appropriate hinges 4 and 4' for connection in rotation. The telescopic rod 41 conceals an identical telescopic rod 42, situated symmetrically relative to the vertical plane V1 passing through the central axis X'X. Each telescopic rod 41, 42 is positioned vertically to the common fitting of the corresponding connecting pair 21, 22 at a distance greater than the length of the pair. In addition, by virtue of the positioning on a common fitting and at the periphery of the radome, each connecting pair 21, 22 is shorter than the corresponding telescopic rod 41, 42. The result of this is a saving in length and thus in mass. Furthermore, the telescopic rods 41 and 42 have an automatic locking position corresponding to the maximum final openness Omax of the radome 1 relative to the face F1 of the fuselage. In the example, the maximum opening is approximately 44°. The operator applies a force (arrow E) until maximum opening is achieved.

The angle of separation a between the arm 20a and the linkage 2a of each connecting pair 21 is approximately 16° in the example shown in lateral projection. A separation of this kind makes it possible to prevent the radome from simply rotating around the axis formed by the front extremity of the linkages 2a (see the description with reference to FIG. 6). In addition, the axes of rotation of the arm 20a and of the linkage 2a are not parallel in order to impose a kinematics on the linking elements, linkages and arms (likewise, see the description with reference to FIG. 6).

Figure 4:
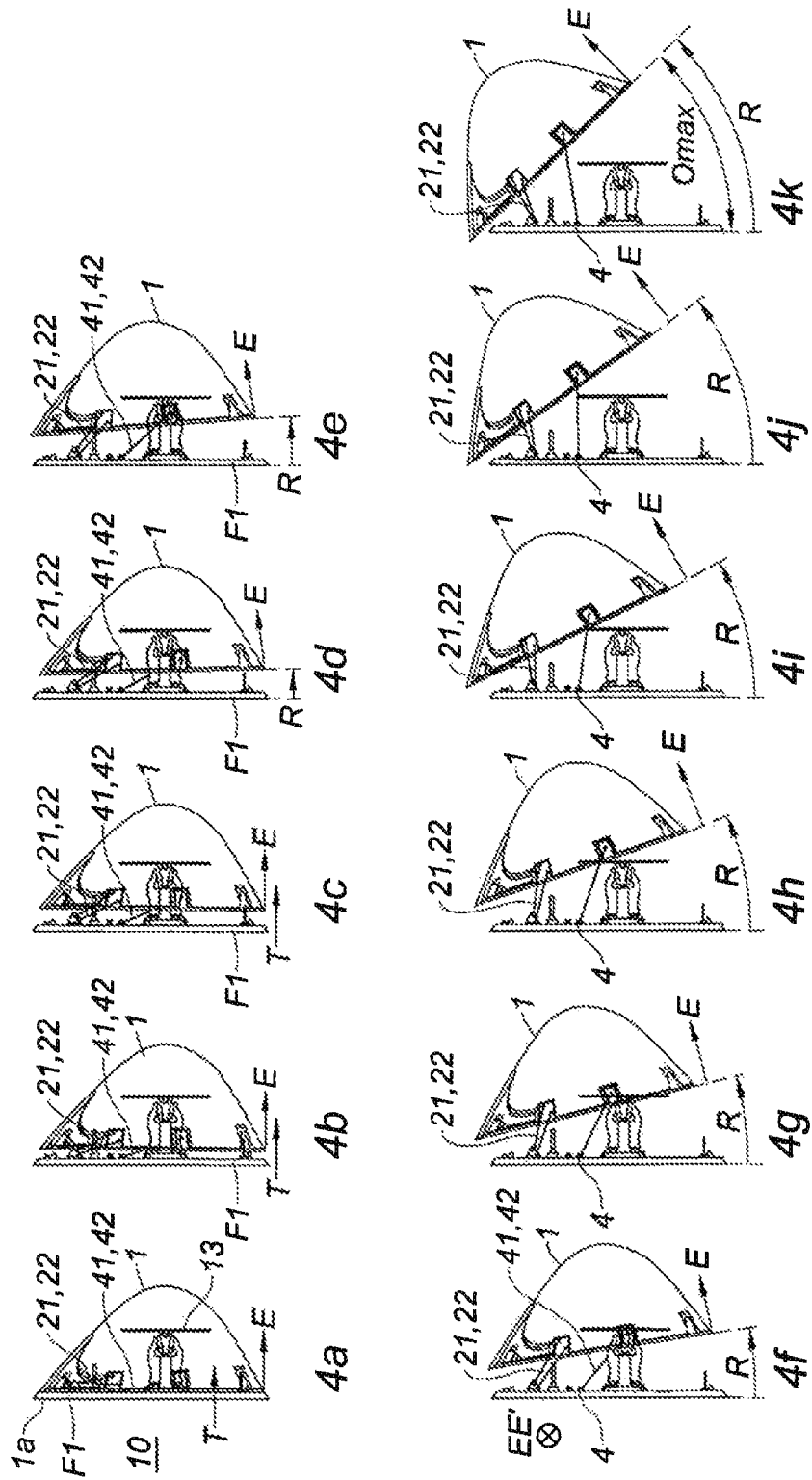
FIG. 4, diagrams 4a to 4k illustrate lateral views of the progressive opening of the radome according to the previous drawings, between an initial position attached to the fixed part and a fully open position.

Diagrams 4a to 4k in FIG. 4 show the progressive change in the opening of the radome 1 in lateral views, between the initial position (diagram 4a) where the circular lip 1a of the radome 1 is disposed as an interface against the face F1 of the fixed part 10 and the final position (diagram 4k) corresponding to the maximum opening Omax. The operator lifts the radome 1, applying increasing thrust from the lower part of the radome 1 (arrow E) until the telescopic rods 41 and 42 lock. The opening kinematics is an opening upwards in use mode (arrow E). The linkages 2a and, respectively, the arms 20a of the connecting pairs 21 and 22 pivot around axes that are symmetrical relative to the vertical plane V1 (see FIG. 2), respectively AA', BB' and CC', DD'. The telescopic rods 41 and 42 pivot around an axis FF' at the hinge 4.

In diagrams 4a to 4k, the same reference symbols used in the previous drawings refer to the same elements.

The dimensions and positions of the connecting pairs 21 and 22 are adjusted so that: in a first phase of translation of the radome (arrows T), illustrated in diagrams 4a to 4c, the lip 1a of the radome 1 remains substantially parallel to the face F1 of the fixed part 10, and—in a second phase of rotation of the radome (arrows R), illustrated in diagrams 4d to 4k, the radome pivots around an axis parallel to the axis FF' in addition to a translation forwards and upwards (parallel to the arrow E).

This breakdown into two phases makes it possible, in particular, to prevent the gasket between the radome and the fixed part from shearing. This is because the separation of the radome is solely axial via the pure translation at the beginning of the kinematics of the movement. Thus, the gasket retains its strength and its sealing function for an appreciably longer period of time.

The partial frontal view of the inner rim Bi of the radome 1 according to FIG. 5 shows a connecting pair 21 with its fittings for attachment to the radome and to the fixed part (which is not shown for reasons of visibility), referenced 31 and 33 respectively.

The fitting 31 is rigidly connected to the inner rim Bi of the radome 1. This fitting 31 has two swivel bearings, 3a and 30a, to receive in rotation the respective adapted extremities of the linkage 2a of the connecting pair 21. The other extremities of the rod 2a and the linkage 20a are received in rotation on the fitting 33 capable of being rigidly connected to the fixed part 10 (see FIG. 6).

The arm 20a is curved and has two machined edges 21a and 22a connected by a plane wall 23a, these two arms merging into a single arm at the extremity mounted on the fitting 31, and coming at the other extremity into articulation on the axis of rotation of the other fitting 33.

A centring sphere 12 is also shown in FIG. 5. This element is also fixed at the rim Bi of the radome 1 and comes into articulation on a complementary centring element rigidly connected to the fixed part in order to provide positioning via centring.

The fitting 33 on the face F1 of the fixed part of the fuselage 10 appears more clearly in the perspective view shown in FIG. 6 which uses the same reference symbols for identical elements. In this drawing, the connections of the linkage 2a and the arm 20a to the attachment fitting 33 of the fixed part 10 are shown in a frontal view, and in a perspective view between the radome 1 and the fixed part 10 and also to the fitting 31 of the radome 1. In particular, the extremities 20e and 2e (20'e and 2'e respectively) of the arm 20a and the linkage 2a respectively are received in rotation by swivel bearings 30a and 3a (30'a and 3'a respectively) formed on the attachment fitting 31 of the radome 1 (the attachment fitting 33 of the fixed part 10 respectively). In this drawing it is apparent that the linkage 2a and the arm 20a are oriented in two different directions. Thus, the axes of rotation of the linkage 2a and the arm 20a, combined with those of the bearings 30a and 30'a for the arm 20a, 3a and 3'a respectively for the linkage 2a, are not parallel to one another at the dome 1 and at the fixed part 10. In other variants, this non-parallelism of the axes is effected on the dome and/or on the fixed part. The axes of rotation of the linkage 20a and the arm 2a of each connection thus have a non-zero angle in two different planes. The angle of separation a between the arm 20a and the linkage 2a is shown here in a lateral view, substantially as actual size. This separation is generally between about 15° and about 20°, approximately 16° in the example.

The connections in rotation on these swivel bearings advantageously bring into play bearing supports made of resilient material, for example of rubber or synthetic elastomer. The views in cross-section given in FIGS. 7 and 8 show in greater detail the configuration of such connections in rotation, in this case the connections of the arm 20a and of the linkage 2a to the bearings 30a and 3a of the fitting 31 shown in FIGS. 5 and 6.

Figure 7:
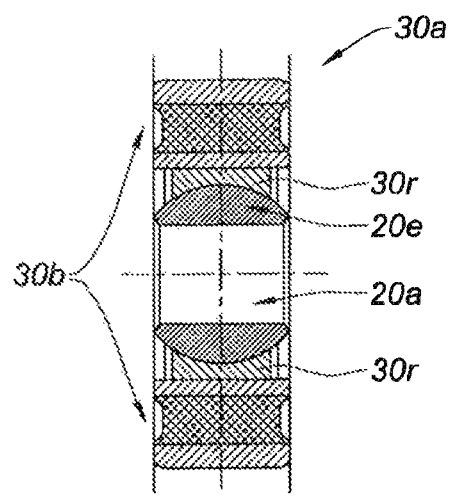
FIGS. 7 and 8 are views in cross section of the means for connection in rotation of an extremity of an arm and an extremity of a linkage on the fixing support of the radome.

With reference to FIG. 7, the extremity 20e of the arm 20a is swiveably mounted on the bearing 30a via a quick release pin 30b. Elements 30r of resilient material serving as bellows provide resilience in all the axes.

Figure 8:
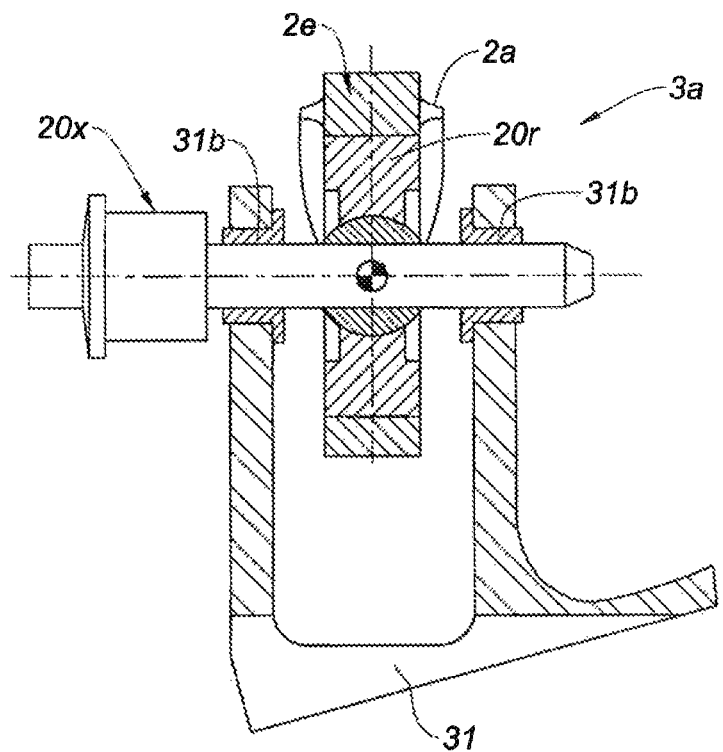

In FIG. 8, the extremity 2e of the linkage 2a is swiveably mounted on a quick release pin 20x of the bearing 3a mounted on the fitting 31 via rings 3 lb. The knuckle 2e is provided with an elastomer material 20r.

The knuckles 2e and 20e provided with elastomer material 20r and 30r have a radial stiffness that is determined so that its maximum displacement (corresponding to the maximum tolerance range of the assembly) is reached for the load corresponding to the locking of the locks at the periphery of the radome.

The present disclosure is not restricted to the examples described or shown above. It is, for example, possible to provide more than two telescopic rods or varied forms of the linkages or coupling rods, and also other types of connection of the movable elements to the radome and to the fixed part, or other geometries at the junctions of these elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A method for opening a dome for the protection of a device to be protected, fitted in a part described as fixed, in which, in the initial position before opening, a plane interface separates the dome from the fixed part, the method comprising:
   connecting the dome to the fixed part by at least two independent double-link connections that are movable in rotation between the dome and the fixed part, the links in a single connection being fitted in common to the dome and to the fixed part to form overall a pantograph in the shape of an isosceles trapezium which, during opening, opens out by pivoting until maximum opening is achieved, so that the dome moves away from the fixed part via a combination of movements in translation and in rotation.

2. The method for opening according to claim 1, in which the links in a single connection are not parallel to one another at the dome.

3. The method for opening according to claim 2, in which the links of each connection have a non-zero angle in two different planes.

4. The method for opening according to claim 1, in which the links of each connection are mounted in articulation on a periphery of the dome.

5. The method for opening according to either claim 1, in which the opening is an opening out upwards in a use mode, a final open position of the dome defining, relative to the initial position, an angle of opening of between 30° and 80°.

6. The method for opening according to claim 5, in which automatic locking is provided when the dome has reached the final open position.

7. The method for opening according to claim 6, in which the automatic locking is produced at the end of a telescopic extension.

8. The method for opening according to claim 6, in which the connections are dimensioned so that the opening starts with a phase of movement of the dome substantially in translation perpendicular to the plane of the interface, followed by a phase of movement of the dome substantially in translation and rotation around a parallel axis of pivot of the pantograph.

9. The method for opening according to claim 1, in which the connections to the dome and to the fixed part have a resilience that enables adjustment to be avoided.

10. A radome capable of being connected to a fixed part, comprising:
    a dome-shaped protective cover; and
    a plurality of linking mechanisms of which first extremities are connected in rotation to the protective cover and second extremities are connected in rotation to the fixed part onto which a communication system to be protected by the radome is mounted,
    wherein the plurality of linking mechanisms include at least two connecting pairs, and the first and second extremities of each connecting pair are mounted on a common fitting for connecting in rotation, and in that each connecting pair forms one of the sides of a pantograph shaped as an isosceles trapezium.

11. The radome according to claim 10, in which the connecting pairs of a single connection have axes of rotation that are not parallel to one another at the fixed part.

12. The radome according to claim 11, in which the axes of rotation of the connecting pairs of each connection have a non-zero angle in two different planes.

13. The radome according to claim 10, in which each connecting pair consists of two linking elements made up of a rectilinear guide linkage and an arm of high mechanical strength, each linking element of each connecting pair being capable of pivoting overall around a fixed axis.

14. The radome according to claim 10, comprising at least two telescopic rods capable of being fixed in rotation to the protective cover and to the fixed part in order to produce automatic locking when the protective cover has reached a final open position.

15. The radome according to claim 14, in which each connecting pair is shorter than the corresponding telescopic rod.

16. The radome according to claim 10, in which swivel bearings connect the first and second extremities of the connecting pairs in rotation to the radome, the swivel bearings on a support made of resilient material.

17. The radome according to claim 10, in which the sides of the isosceles trapezium form an angle of 50° to 70°, with one of the bases of the isosceles trapezium.

18. The radome according to claim 13, in which the linkage and the arm of each connecting pair have, in lateral projection when in use, an angle of separation of from 5° to 30°.

19. The radome according to claim 13, in which the arms with high mechanical strength are curved, forming two edges machined as ribs.

20. The method for opening according to claim 1, in which the links of each connection are mounted in articulation on an inner rim of the dome.

* * * * *